Nov. 23, 1954   I. E. COFFEY   2,695,366
STARTING SYSTEM FOR INTERNAL-COMBUSTION ENGINES
Filed May 21, 1952   5 Sheets-Sheet 1

INVENTOR.
IRVEN E. COFFEY
BY
*George R. Ericson*
ATTORNEY

Nov. 23, 1954      I. E. COFFEY      2,695,366
STARTING SYSTEM FOR INTERNAL-COMBUSTION ENGINES
Filed May 21, 1952      5 Sheets-Sheet 2

INVENTOR.
IRVEN E. COFFEY
BY
*George R. Ericson*
ATTORNEY

Nov. 23, 1954   I. E. COFFEY   2,695,366
STARTING SYSTEM FOR INTERNAL-COMBUSTION ENGINES
Filed May 21, 1952   5 Sheets-Sheet 3

INVENTOR.
IRVEN E. COFFEY
BY
ATTORNEY

Nov. 23, 1954

I. E. COFFEY 2,695,366

STARTING SYSTEM FOR INTERNAL-COMBUSTION ENGINES

Filed May 21, 1952

*INVENTOR.*
IRVEN E. COFFEY
BY
ATTORNEY

Nov. 23, 1954     I. E. COFFEY     2,695,366
STARTING SYSTEM FOR INTERNAL-COMBUSTION ENGINES
Filed May 21, 1952     5 Sheets-Sheet 5

INVENTOR.
IRVEN E. COFFEY
BY
George R. Ericson
ATTORNEY

# United States Patent Office 2,695,366
Patented Nov. 23, 1954

2,695,366

STARTING SYSTEM FOR INTERNAL-COMBUSTION ENGINES

Irven E. Coffey, Clayton, Mo.

Application May 21, 1952, Serial No. 289,079

18 Claims. (Cl. 290—36)

This invention relates to control systems for the electric starting motors of internal combustion engines in motor vehicles and the like, and particularly to that part of the control system which actuates the solenoid controlling the electric power supply to the starter motor when arranged to be actuated from the control for transmission response of the motor vehicle.

In most of the present models of motor cars, especially those equipped with automatic transmissions, it is not possible to restart the engine when it stalls without first moving the transmission control selector lever from a driving position to a neutral or park position. This obvious safety feature is necessary to prevent injury to the vehicle, its occupant, or any person or property adjacent the vehicle, in case the engine could be started with the control selector lever in a driving positions. With the present types of automatic transmissions it is not immediately apparent, as in conventional gear transmissions, that the transmission is engaged or in gear.

In motor vehicles equipped with sliding gear transmissions or constant mesh gear types, it is rather common to leave the transmission control selector lever in driving position when parked, but, if the operator forgets to release the clutch or shift it to neutral before operating the starter switch, the movement of the car usually warns him in time to release the clutch or the starter switch before the engine can start and any serious damage is done. This is because the starter is driving the car forward or backward, and battery power is insufficient to turn the engine fast enough to start.

This is not the case with automatic transmissions however, since practically all types incorporate a fluid coupling or torque converter. In the absence of a safety feature such as that now generally used, if the starter were operated with the control lever in a driving position, there obviously would not be the immediate warning movement such as given by direct gear types, nor would a heavy load be imposed on the battery, because of the amount of slip in fluid drives at low speed. For this reason the engine would probably start and the car surge forward or backward depending on the position of the transmission control selector lever.

Probably because this danger was obvious to most motor car manufacturers, the control circuit for the starter was provided with an additional neutral safety switch operated by the transmission control selector lever in series with the ignition switch and manually operated starter switch, which additional switch is closed only in indicated neutral or park positions of the transmission control selector lever. Although this provides a desirable safety feature it also has some disadvantages.

For example, in motor vehicles having this safety feature, if the engine should stall while the control selector lever is in a driving position, it is necessary to move the control selector lever to an indicated neutral position, and to close the manually controlled starter switch in order to restart the engine. This disadvantage confuses and delays the restarting of the engine and is decidedly irritating to the operator if the engine stalls in heavy traffic.

It is possible for the engine to stall under such conditions due to improper fuel feed, or the like. The delay incurred in shifting the control selector lever to a neutral position and, at the same time, operating the usual manual starting switch, the accelerator, and the brake, if the car happens to be on an incline, can be decidedly confusing, even to an experienced driver.

In view of the above it appears that restarting of the engine by a single operation involving only movement of the transmission control selector lever to a predetermined neutral position would be advantageous. In order to achieve this highly desirable result I propose eliminating the neutral safety switch, and the conventional starter button, and replacing them by a switch closed by moving the transmission control selector lever to a predetermined neutral position. By this means the necessity of two separate operations—moving the control selector lever to a neutral position and closing the conventional starter button—is eliminated by combining them in one operation.

I further propose an operative connection between the transmission control selector lever and the carburetor throttle valve whereby additional movement of the former in a neutral range for transmission response opens the throttle, thereby eliminating the need for the usual manual operation of the accelerator. Obviously, the precise location of this predetermined neutral position depends upon the particular path of movements of the transmission selector lever, and is wholly optional.

I further propose that the transmission control selector lever be permitted a range of movement in the usual neutral for transmission response, which range will be sufficient to not only actuate the throttle to be opened slightly when the starter switch is closed, such as is proper for starting a cold engine, but also to permit the operator to move the transmission selector lever any amount up to an extreme position in that range, and thereby open the throttle any amount, including a wide-open setting when the starter switch is closed, such as is proper for starting a hot engine. Such a range of movements permits a degree of throttle opening suitable for all starting conditions, and, furthermore, is highly desirable for choke unloading in the wide-open throttle position. I further propose that the dial which is usually provided to indicate the individual transmission response settings for the transmission control selector lever be provided with additional indications for cold starting and hot starting, which indications may be used as a guide by the operator for proper positioning of the throttle by the transmission control selector lever for hot starting and cold starting.

In order to prevent damage to the starting motor and the gear between it and the vehicle engine in case the control selector lever be held in its starting range of positions after the engine has actually started, or in case the control selector lever should inadvertently be moved to a starting position during operation of the engine, I provide additional means responsive to a condition or conditions indicative of engine operation for opening the starter motor circuit so as to prevent energization of the starter motor while the engine is operating normally. Such a means consequently permits the transmission control selector lever to be used as a hand throttle, if desired.

It is therefore an object of this invention to provide a starting system in which the engine is started by moving the control selector lever to a predetermined neutral position, so that, in order to start the engine at any time, the only manual operation required is the movement of the control selector lever. Since, according to my invention, this unitary operation is the normal starting procedure at all times, the possibility of confusion should the engine stall on a railroad track, for example, is eliminated.

Another object of this invention is to provide means for energizing the starting motor circuit by moving the transmission control selector lever to a predetermined neutral position.

A further object is to provide additional means responsive to a condition indicative of engine operation whereby the starting motor circuit is opened as soon as the engine starts, and is held open during normal operation of the engine.

A further object is to provide means in connection with said first named means whereby prior to the energization of the starting motor circuit, the carburetor throttle valve is opened a predetermined amount and held open until the control selector lever is permitted to move away from the predetermined starting position.

A further object of this invention is to provide for hand operation of the throttle by the transmission control selector lever when, due to carburetor icing, the engine stalls each time the throttle is returned to normal idling range, as, for example, while waiting for a traffic signal to change and the operator's foot is occupied with actuation of the brake. This object is achieved by providing means whereby the throttle may be held open varying amounts by holding the control selector lever in starting positions.

A further object of this invention is to combine in a single operating lever the functions of transmission control, together with engine starting control for both the starter motor and the engine fuel system.

A further object of the invention is to provide in a single control lever the functions of transmission control and engine throttle control.

*Brief description*

According to the invention, these objects are attained by replacing the conventional manually operated starter switch and the neutral safety switch with a switch closed by moving the transmission control selector lever to a predetermined neutral starting position. The transmission control selector lever is operatively connected to the carburetor throttle valve so that, as the transmission control selector lever is moved to the starting position, the throttle valve is opened a predetermined amount, and is held open until the transmission control selector lever is moved, or is permitted to move away from the starting position.

In order to prevent accidental energization of the starter by inadvertent movement of the control selector lever to the starting position, according to one modification of my invention, I ground the starter solenoid relay through the generator, so that, when the engine begins to run, the increased speed of the generator produces an increasing counter-electromotive force opposing the flow of current from the battery through the starter solenoid, thereby so weakening the holding force in the solenoid that the relay is permitted to open, de-energizing the starter motor. This is accomplished by approximately half of the generator potential necessary to close the generator cut-out, and thus provide a means responsive to a condition indicative of engine operation to de-energize the starter motor.

According to another modification, the solenoid relay is eliminated from the circuit and is replaced by an oil pressure switch, so that, when the engine starts operating and oil pressure builds up to a predetermined value indicative of engine operation, the oil pressure switch opens, breaking the circuit through the solenoid coil, thus de-energizing the starting motor.

According to another modification, the solenoid relay is similarly eliminated from the starting motor circuit and is replaced by a switch responsive to manifold suction, so that, when the engine starts operating and manifold vacuum reaches a predetermined value indicative of engine operation, the switch opens, breaking the circuit through the starter solenoid, and de-energizing the starting motor.

All of the above-described modifications provide for hand operation of the throttle by the transmission control selector lever when, due to carburetor icing, the engine stalls each time the throttle is returned to the normal idling range, as, for example, while waiting for a traffic signal to change the operator's foot is occupied with actuation of the brake. Under these circumstances, the lever provides a convenient means whereby the throttle may be held open varying amounts by movement of the control selector lever within the range of starting positions. This function is possible with the engine running because the starting circuits will not be energized because of the functioning of the above-described means for preventing their accidental energization.

This application is in the nature of a continuation-in-part of my prior application, Serial Number 231,334, filed June 13, 1951, for Starting System for Internal Combustion Engines. The application not only includes the invention disclosed in my prior application, but also further improvements.

Referring to the drawings, the numeral 10 indicates a power source, preferably an internal combustion engine, which power source includes a generator 11 driven from the engine by means of a belt 12. The engine 10 is provided with a carburetor 14 conventionally mounted on an intake manifold for the engine. Carburetor 14 is provided with usual means for regulating the supply of fuel to the engine, which means includes a conventional butterfly throttle valve (not shown) mounted on a shaft 17 rotatably journaled in the mixture conduit of the carburetor. Shaft 17 is fixedly secured to an operating arm 18, which is, in turn, connected by a rod 19 with the usual accelerator pedal (not shown). It should be understood that the carburetor 14 also includes the usual automatic choke mechanism, or the like, which choke mechanism is thermally controlled, as is usual, and includes mechanism operating from the throttle shaft 17 for unloading the choke valve in extreme ranges of throttle opening movement.

Generator 11 serves as an electrical power source for the circuits associated with the engine, and is provided with a field diagrammatically shown at 22, in turn grounded at 23. The armature has two brushes, one of which is grounded at 24, and the other of which is connected by a lead 26 to the electromagnet of generator cut-out 27, and thence to one contact point 31 of cut-out 27. A shunt winding 30 connects lead 26 to ground 28. The contact 31 is adapted to connect with contact 32 to close the circuit through lead 33, ammeter 35, and leads 36 and 37, to battery 39, the other terminal of which is grounded at 40. When the generator begins to operate, voltage builds up and forces current through the shunt winding of the cut-out 27, thereby magnetizing the solenoid core. When the voltage reaches the value for which the cut-out relay 27 is set, the magnetism is strong enough to close contact points 31, 32, causing the generator current to flow through the series winding of the cut-out relay, and then to the battery and other elements of the starting system. When the generator slows to engine idling speed or stops, current begins to flow from the battery 39 back to the generator, reversing the current flow through the series winding of relay 27. This reduces the magnetism of the relay electromagnet 27 to the extent that it can no longer hold the contact points 31, 32 closed. Consequently, the circuit between the generator 11 and battery 39 is open.

The conventional engine ignition circuit is also shown connected to the battery 39 by leads 41 and 36 to the primary terminal of a key-actuated twist switch 42. The secondary terminal of switch 42 is connected by a lead 43 through the primary of coil 44, and thence to the engine-operated breaker points 45 to ground 46. The secondary winding of coil 44 indicated as 44' is connected by a lead 47 to the central terminal of distributor cap 48, and also with ground 49.

The above described system is intended to illustrate generally the usual ignition system for internal combustion engine 10. Since it forms no part of the present invention, this description, although not complete, is deemed sufficient for the present purposes.

Figure 1:
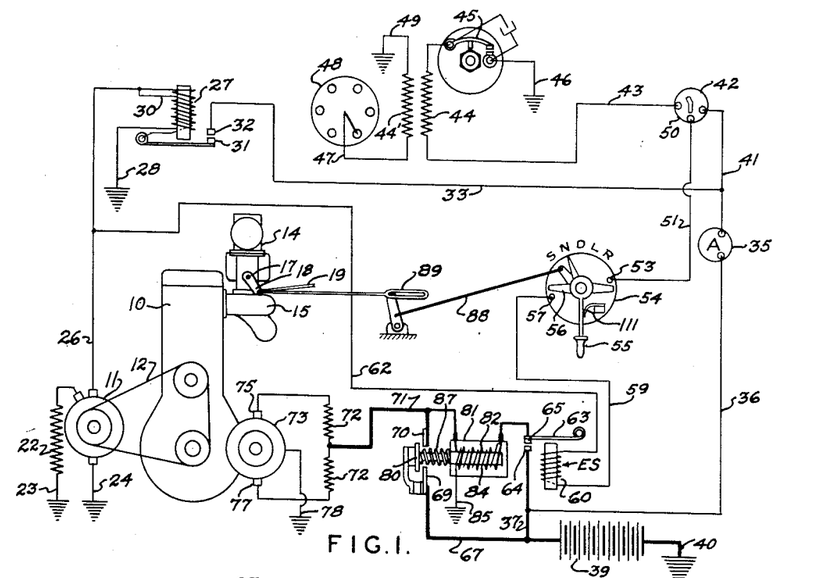
Fig. 1 is a diagrammatic view of the parts of the starter system circuit including engine, generator, starting motor, solenoid relay ignition switch, all regarded as in a conventional arrangement. In addition thereto is shown a control selector lever-operated starting switch, and one of several means responsive to a condition indicative of engine operation for breaking the starting motor circuit when the engine is operating.

Fig. 1 also shows diagrammatically a conventional starter motor control system, which will now be described in detail.

A third terminal 50 on twist switch 42 is connected by a lead 51 to terminal 53 of a switch 54. Switch 54 is a rotary switch, and is operatively connected to the transmission control selector lever 55, which is manually rotatable to several possible positions indicated by the letters S—N—D—L and R. These positions not only include the conventional neutral, drive, low and reverse, such as presently in use on automatic transmission controls, but, in addition, include an added position S closely adjacent the N or neutral position to indicate the closed position of the switch 54 for operating the starter motor through the control system herein described. Included in switch 54 is a rotatable contact arm 56 actuable by the selector lever 55 to close the circuit between a pair of terminals 53 and 57 when the control selector lever is positioned at S only. When in other positions, the lever 55 disconnects terminals 53 and 57.

From the terminal 57 of switch 54, a lead 59 extends to the starter solenoid relay electromagnet ES, which, in turn, is connected by a lead 62 to the generator by way of lead 26. Under certain conditions, later described, when twist switch 42 is closed, and when switch 54 is moved to starting position S, electromagnet 60 will be energized, causing its armature 63 to close contacts 64 and 65 in the main starter motor circuit. This circuit extends from the battery 39 by way of lead 37 to contact 64, and from contact 65 through the starter solenoid switch to the starter motor, as will be later described.

The main power circuit for the starter motor, however, extends from the battery by way of lead 67 to a contact point 69 of a starter solenoid switch. The other contact 70 is connected by way of lead 71 to a split field circuit 72 of starter motor 73, and thence to the starter brushes 75 and 77. The starter motor circuit is grounded through the motor casing, as diagrammatically illustrated at 78.

The circuit between the contact 69 and 70 is closed by a movable armature 80 of starter solenoid 81. Starter solenoid 81 has a series winding 82 connected with contact 65 of solenoid relay armature 63 and grounded through the starter motor 73. A shunt winding 84 on the solenoid 81 is grounded at 85. When the solenoid of the relay electromagnet 60 is energized as described above, thereby closing contact 64 and 65, the current flows from battery through the control circuit, including the windings 82, 84 of the starter solenoid switch 81, and thence to ground 78, to the starter motor 73. Solenoid 81 is thereby energized, causing armature 80 to close the circuit between contacts 69 and 70, against the resistance of spring 87. This energizes the main power circuit from the battery to the starter motor, and the flow of current through the winding 82 decreases to practically zero because of the shunting effect of the main power circuit. Under ordinary conditions, this would de-energize solenoid 81. For this reason, a holding winding 84 is provided which has sufficient strength to maintain the switch 80 closed. The starter motor, being thus energized, starts to crank the engine, and the cranking will continue so long as relay ES remains closed. Provision is made, however, to open this relay after the engine begins to operate, for, as soon as the engine operates, the speed of generator 11 results in a generated voltage in the lead 26, which prevents the current passing through the magnetic coil from the solenoid relay electromagnet of switch ES to ground through the generator. Thereupon, relay points 64, 65 open, breaking the circuit through the solenoid 81, which, being de-magnetized, permit spring 87 to urge armature 80 outwardly, thus breaking the starter motor power circuit and de-energizing the starter motor.

Starting of the engine 10 requires that the throttle valve be opened from the idle position to provide sufficient initial fuel and mixture. Ordinarily this is accomplished manually by the operator depressing the accelerator pedal sufficiently to crack the throttle through the operating arm 17 and link 19. According to this invention, however, the throttle is cracked by moving the transmission control selector lever to the starting position S. As is diagrammatically shown in Figs. 1, 2, 3 and 4, transmission control selector lever 55 is operatively connected by a system of cranks and linkages 88, and lost motion linkage 89, to throttle shaft 17 by way of throttle arm 18, so that, as selector lever 55 is moved from position N to position S, the throttle valve is likewise moved from a substantially closed to an open position, as shown in the dotted line view in Fig. 4. The structure so far described provides for sequential operation of the throttle and the starter motor, and the linkage can be adjusted to produce operation of the throttle first or second, as desired.

Figure 2:
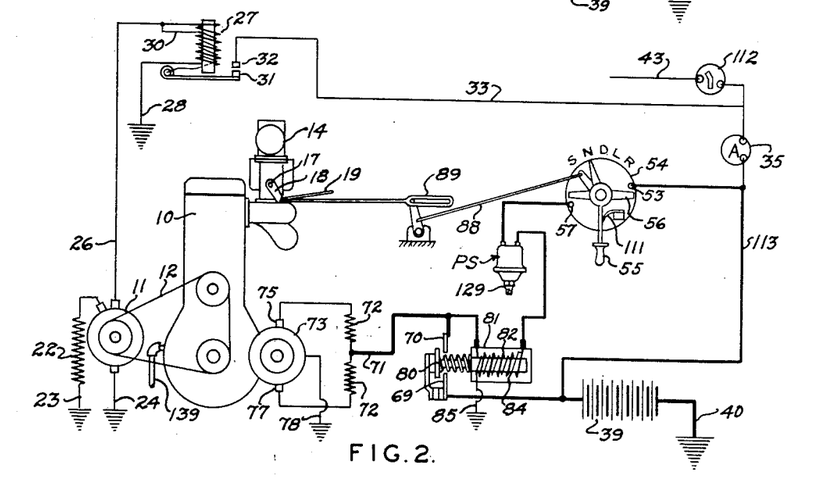
Fig. 2 is a diagrammatic view similar to Fig. 1, showing a different means for breaking the starting motor circuit when the engine is in operation.
Figure 3:
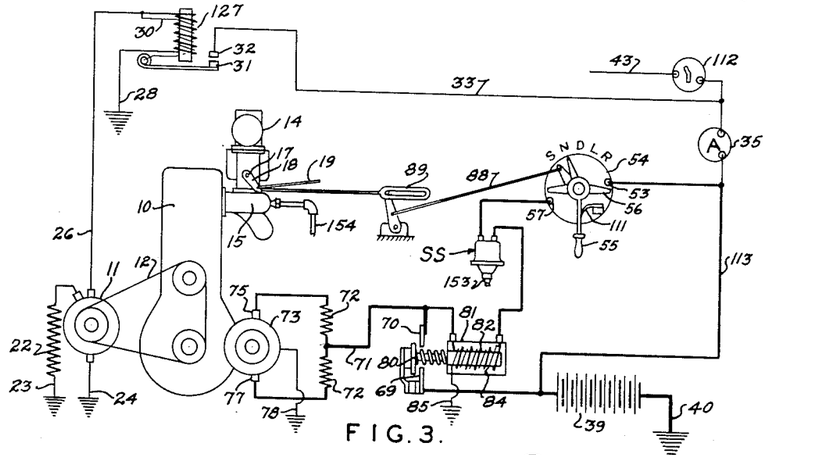
Fig. 3 is a diagrammatic view similar to Fig. 2, but showing another modified means for breaking the starting motor circuit when the engine is in operation.
Figure 4:
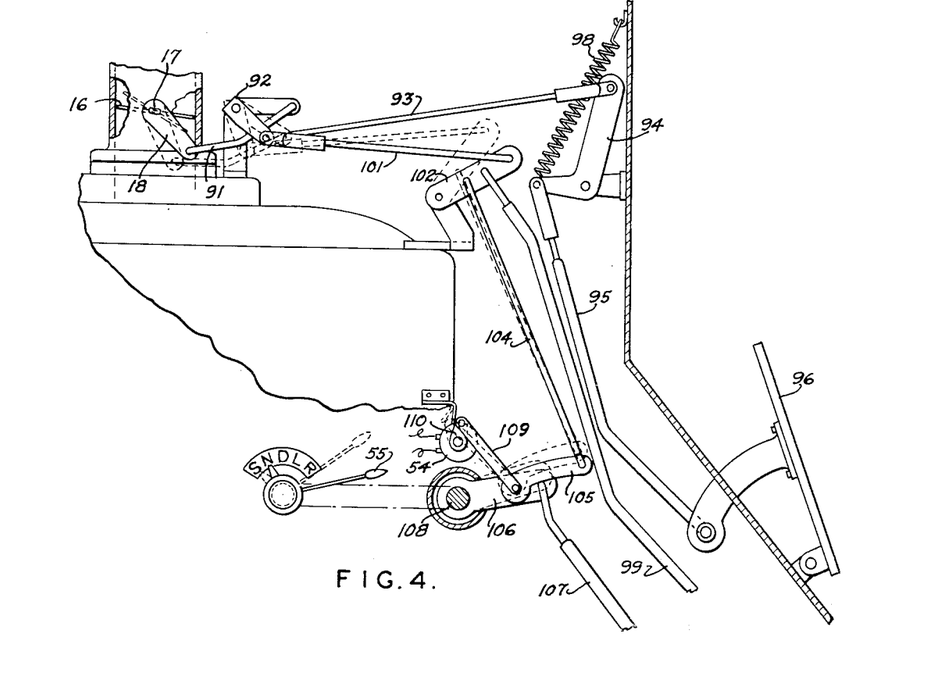
Fig. 4 is a detailed view of the throttle actuating linkages.

Referring now to Fig. 4, the throttle-operating linkage diagrammatically indicated in Fig. 1, and also in Figs. 2 and 3, by the numerals 88 and 89, is shown in greater detail. Carburetor throttle shaft arm 18 is connected by a linkage 91, bell crank 92, rod 93, bell crank 94, and rod 95 to accelerator pedal 96, which is hinged to the floor boards in the usual manner. A spring 98 normally urges the linkage to the closed throttle position. Bell crank 92 has a second actuating mechanism which comprises rod 101 connected thereto, lever 102, rod 104, and an arm 105, which is pivotally mounted on a crank arm 106 actuated through a shaft 108 from the control selector lever arm 55. The crank arm 106 is thereby positioned by movement of the control selector lever, and has an additional connecting rod 107 at its outer end, so that the movements of the control selector arm 55 will be communicated directly by way of the rod 107 with the control mechanism on the transmission for the engine 10. A second link 99 communicates throttle movement to the transmission. Movement of the control selector 55 to the positions D—L and R produces a movement in a clockwise direction of the crank arm 106, and during this rotary motion in this direction, rod 107 will be withdrawn from engagement with the bottom edge of pivoted link 105 thereon. With the arm 106 in a position corresponding to that shown, and when the control selector lever 55 is in the N position, the tip of rod 107 comes into engagement with the bottom edge of arm 105. Therefore, as shown by the dotted lines in this picture, as arm 106 is rotated from N to S, rod 107 bears against the lower edge of pivoted arm 105, causing the arm to act as a rigid extension of crank arm 106. The movement of control selector lever 55 to the S position displaces the linkage 105, 104, 102, 101 to the dotted line positions shown, and opens the throttle from the full line to the dotted line position. At the same time, link 109, which pivotally connects arm 105 on crank arm 106, moves switch arm 110 of starting switch 54 to close the starting circuit between contacts 53 and 57. As shown in Fig. 1, a small leaf spring 111 is mounted on the switch 54, bearing directly against the control selector lever 55, and is compressed by the lever when moved to the S position, so that, as soon as manual pressure is released from the control selector lever 55, springs 98 and 111 urge the throttle back to its initial closed position and force the arm 55 back to neutral position, thereby breaking the circuit between contacts 53 and 57.

Operation of the modification of my invention shown in Fig. 1 is as follows: With the engine inoperative and all the circuits de-energized, the operation of the twist switch 42 to energize the ignition closes the circuit from the battery 39 through the twist switch to the control selector lever starting switch 54. To start the engine, the operator merely moves the control selector lever 55 toward the S position, thus opening the throttle by means of the lost motion linkage diagrammatically indicated as 88, 89, and closing the circuit between the switch terminals 53 and 57 to energize the relay electromagnet of switch ES, and closing relay points 64, 65. Thus the control circuit for the starter motor is energized, and this control circuit will operate to energize starter solenoid 81, thereby closing the circuit from 69 to 70 to energize the main power circuit for the starter motor to crank the engine 10. As soon as the engine begins to operate, generator 11 attains sufficient speed to generate a voltage which prevents the passage of current from the magnetic coil of relay ES through the generator to ground, thereby de-energizing solenoid 60, whereby the control circuit from contact 64 to 65 is opened. Since the control circuit is open, the holding winding 84 becomes de-energized, opening the main starter power circuit. As has been before stated, once the engine 10 operates, the starter motor ceases to operate and any movement of the control selector lever 55 to the S position will fail to operate the starter motor. Consequently, it is safe to use the control selector lever as a hand throttle control for the engine when operating.

Figure 5:
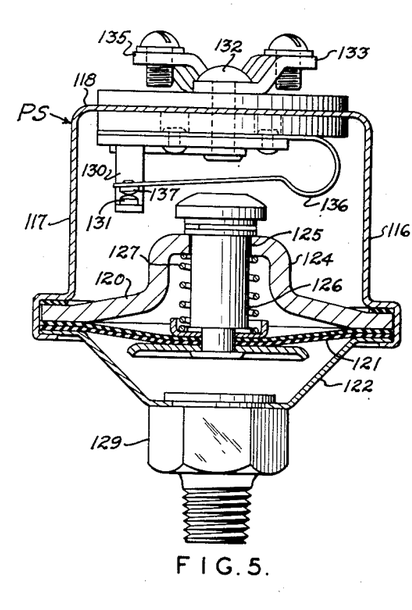
Fig. 5 is a sectional view of an oil pressure switch as used in the circuit shown in Fig. 2.

Referring to Fig. 2, it will be noted that a circuit in most respects similar to that of Fig. 1 is shown, with certain exceptions. A two-terminal twist switch 112 is provided in place of the three-terminal switch 42 of Fig. 1, and a heavy lead 113 connects the battery directly with terminal 53 of selector lever starting switch 54. An oil pressure switch PS, shown in detail in Fig. 5, is connected in series between terminal 57 of selector lever switch 54 and starter solenoid 81. In this modification, switch PS is a means responsive to a condition indicative of engine operation. Referring momentarily to Fig. 5, it will be seen that the switch is enclosed in a casing 116 formed by cylindrical side wall 117, top wall 118, and bottom web 120. A flexible diaphragm 121 extends across the chamber immediately below the bottom web and is clamped in position by a frusto-conical housing 122 forming a pressure chamber beneath the diaphragm. Web 120 has a cup-shaped intermediate portion 124 with a central opening 125. A plunger 126 having an insulated head portion is centrally secured to diaphragm 121. Plunger 126 fits closely in opening 125 and is guided thereby in its vertical movements. Diaphragm 121 is constantly urged downwardly by coil spring 127. A fitting 129 secured in housing 122 provides for the connection of an oil pressure line. Top wall 118 of casing 116 is provided with insulating gaskets which mount a stationary contact strip 130 and contact point 131 by means of rivet 132, connected to external terminal clip 133. A second rivet (not shown) connects an external terminal clip 135 and one leg of a U-shaped spring 136, the other leg of which carries contact point 137. Contact point 137 is thus normally in contact with point 131, until oil pressure below the diaphragm reaches a sufficient value to urge diaphragm 121 and plunger 126 against spring 127, thereby separating points 131 and 137. An oil pressure line 139 connects fitting 129 directly with the oil pump of engine 10, which provides a power source for the circulation of engine lubricant.

Operation of the modification of the invention illustrated in Fig. 2 is as follows: With the engine inoperative, and all circuits de-energized, if it is desired to start the engine, the operator moves control selector lever 55 toward position S, thus automatically cracking the throttle by means of lost motion linkage 88, 89. The same movement of control selector lever 55 moves contact arm 56 into contact with points 53 and 57, thereby closing a circuit from the battery to terminal 133 of oil pressure switch PS. Due to the absence of oil pressure, contact points 131 and 137 are in contact with each other so that the coils 82 and 84 of starter solenoid 81 are energized, thereby causing armature 80 to close the gap between starter solenoid contact points 69 and 70. A circuit is thus completed between battery 39 and starting motor 73, which commences to crank the engine. As soon as the engine begins to operate and a predetermined oil pressure is built up, the latter being transmitted to the pressure chamber of oil pressure switch PS, pressure switch contact points 131 and 137 are separated, thereby de-energizing starter solenoid 81. With the consequent demagnetization of starter solenoid 81, its contact points 69 and 70 are separated, thereby de-energizing starting motor 73 and rendering it inoperative.

Figure 6:
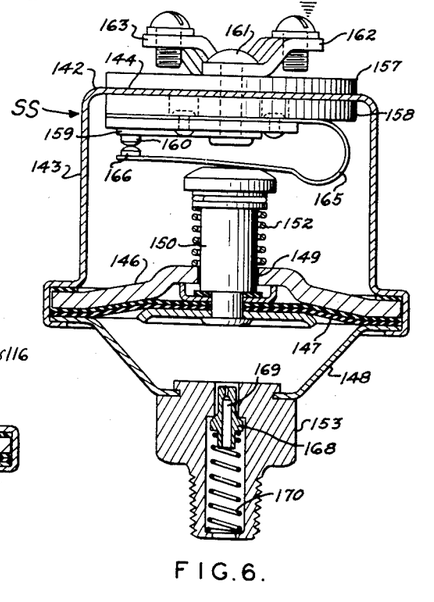
Fig. 6 is a sectional view of a vacuum responsive switch as used in the circuit shown in Fig. 3.

Fig. 3 illustrates a circuit identical with that of Fig. 2 except that a vacuum responsive switch SS is used as a means responsive to a condition indicative of engine operation in place of and for the same purpose as oil pressure switch PS. As shown in Fig. 6, switch SS is enclosed in a casing 142 formed by cylindrical side wall 143, top wall 144, and bottom web 146. A flexible diaphragm 147 extends across the chamber immediately below the bottom web and is clamped in position by a frusto-conical housing 148 forming a pressure chamber beneath the diaphragm. Web 146 is formed with a cylindrical central opening 149. A plunger 150 formed with an insulated head portion is centrally secured at one end to diaphragm 147. Plunger 150 fits closely in opening 149 and is guided thereby in its vertical movements. Diaphragm 147 is constantly urged upwardly by coil spring 152. A fitting 153 secured in housing 148 provides for the connection of a vacuum line 154 to the intake manifold 15 of engine 10. Top wall 144 of casing 142 is provided with insulating gaskets 157 and 158 and mounts a stationary contact strip 159 and contact point 160. A rivet 161 connects contact strip 159 with external terminal clip 162. A second rivet (not shown) connects external terminal clip 163 to one leg of a U-shaped spring 165, the other leg of which carries contact point 166. Contact points 160 and 166 are thus normally held in contact due to the upward pressure of spring 152 until manifold vacuum increases to a sufficient value to urge diaphragm 147 and plunger 150 downwardly, thus permitting U-shaped spring 165 to separate points 160 and 166. After the engine has been started, in order to prevent closing of contacts 160, 166, and possible energization of the starting motor due to sudden momentary drops in vacuum, inlet fitting 153 is provided with a poppet type check valve 168 formed with a small central opening 169. A coil spring 170 urges valve 168 towards its seat, in opposition to vacuum which tends to unseat the valve. During normal engine operating conditions, manifold vacuum is sufficient to unseat valve 168, thereby fully opening the inlet of suction chamber 148. If there occurs a momentary sudden drop in manifold vacuum due, for example, to a rapid movement of the throttle valve to wide open position, spring 170 seats valve 169, so that the only means for communicating the increased manifold pressure to the diaphragm chamber is restricted central opening 169. Thus there is a delay in transmitting the increased pressure to the diaphragm chamber, which prevents opening of contacts 160, 166. If the reduction in vacuum is only momentary, contacts 160, 166 will remain open, and, even if control lever 55 be in the S position, the starting circuit will not be energized.

Operation of the modification shown in Fig. 3 is as follows: With the engine inoperative, and all circuits de-energized, if it is desired to start the engine, the operator moves control selector lever 55 toward position S, thus automatically cracking the throttle by means of lost motion linkage 88, 89. The same movement of control selector lever 55 moves contact arm 56 into contact with points 53 and 57, thereby closing a circuit from the battery to terminal 162 of vacuum switch SS. Due to the absence of manifold vacuum, contact points 160 and 166 are in contact with each other so that the coils 82 and 84 of starter solenoid 81 are energized, thereby causing armature 80 to close the gap between starter solenoid contact points 69 and 70. A circuit is thus completed between battery 39 in starting motor 73, which commences to crank the engine. As soon as the engine begins to operate and manifold vacuum reaches a predetermined value, diaphragm 147 and plunger 150 move downwardly, thereby permitting contact points 160 and 166 to separate. Thus starter solenoid 81 is de-energized and demagnetized, so that its contact points 69 and 70 are separated, thereby de-energizing starting motor 73 and rendering it inoperative. If, after the engine has started, the operator holds control lever 55 in the S position and fully depresses the accelerator pedal, thus suddenly reducing vacuum, check valve 169 prevents instant transmission of the increased manifold pressure to the diaphragm and the consequent closing of contacts 160, 166. This, in turn, prevents energization of the starting circuit and consequent damage to the starting motor gears.

It should be noted, in connection with each of the modifications described above, that even when the engine is in operation, transmission control lever 55 may be utilized to open throttle valve 16, and to hold it open. This may be done without in any way affecting the operation of the starting circuits, since, in the modification shown in Fig. 1, during engine operation, back-up voltage from generator 11 causes solenoid relay switch 60 and the starting motor circuit to remain open; in the modification of Fig. 2, during engine operation, oil pressure in switch PS causes switch PS to remain open, thus preventing energization of the starting motor; in the modification shown in Fig. 3, during engine operation, vacuum transmitted from the manifold to vacuum switch SS causes switch SS to remain open, thus preventing energization of the starting motor circuit.

It is desirable for several reasons to provide in such a mechanism a throttle control which can operate the throttle throughout its full range of movement. Full range of throttle movement produces better starting when the engine temperature is high, and also permits operation of the choke valve unloading mechanism if an automatic choke is provided on the carburetor, as is the usual case. The mechanisms previously described are readily adapted for this purpose by modification of the switch 54. This is illustrated diagrammatically by Figs. 7 and 8. Corresponding parts in these views are indicated by the same reference characters.

Figure 7:
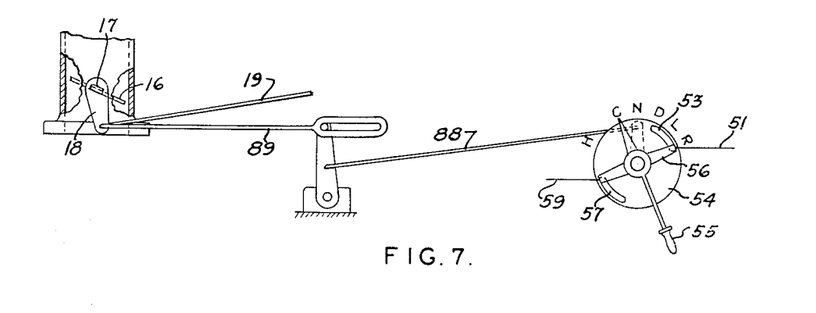
Fig. 7 is a diagrammatic view illustrating a modification showing the throttle position corresponding with the initial starter switch closed position.
Figure 8:
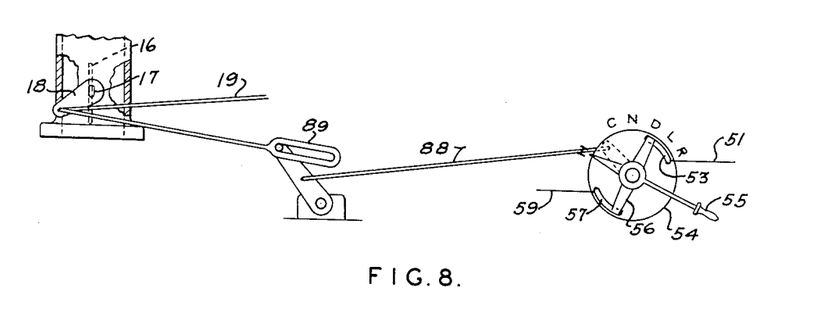
Fig. 8 is a diagrammatic view illustrating a second throttle position corresponding to a closed position of the starter switch. This view, taken with Fig. 7, shows the full range of throttle openings of which the mechanism is capable.

In Fig. 7 switch 54 is modified by enlarging the contacts 53 and 57 and providing the indicating dial with new indicia C indicating the approximate position for lever 55 for throttle opening for cold starting, and H indicating the approximate position for lever 55 for hot starting. In the C position of lever 55 the throttle is partially open, as shown in Fig. 7, and Fig. 8 shows the throttle fully open when lever 55 is in the H position.

Figure 9:
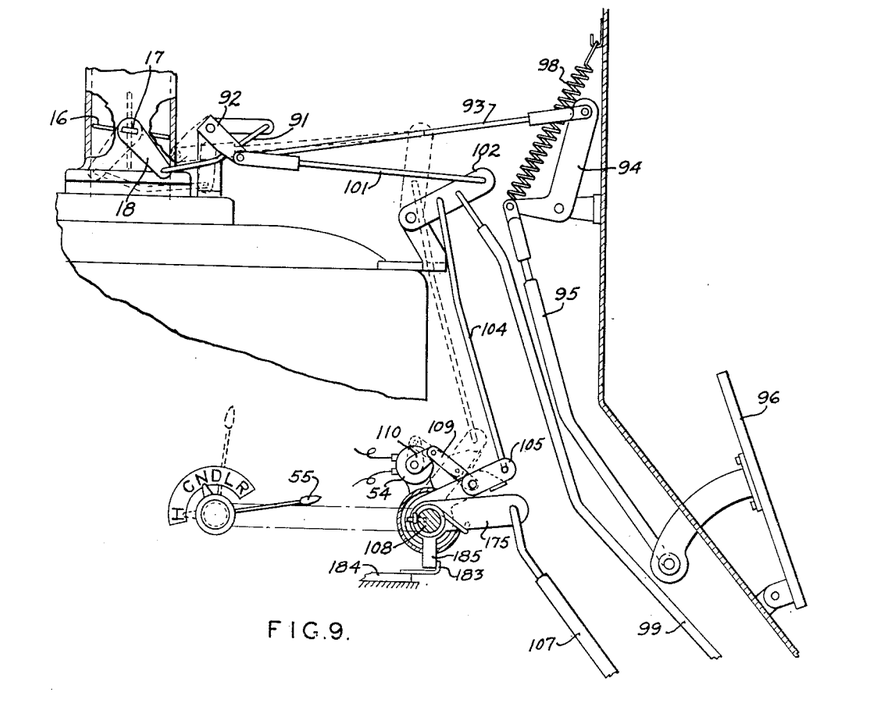
Fig. 9 is a detailed view of a modified form of throttle and switch actuating linkage.
Figure 10:
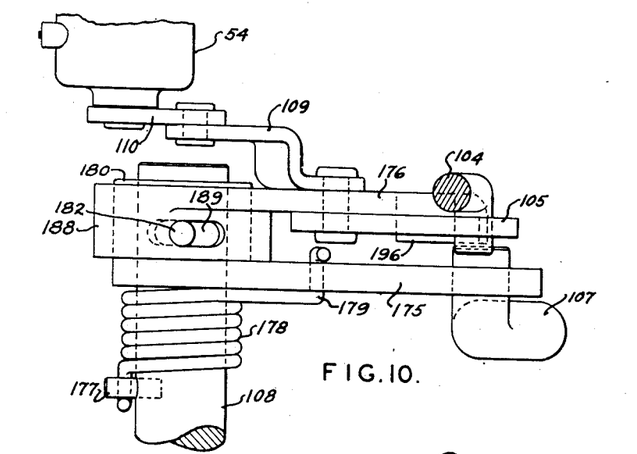
Fig. 10 is a top plan view showing in detail the connection between the throttle, switch, and transmission control shaft.
Figure 11:
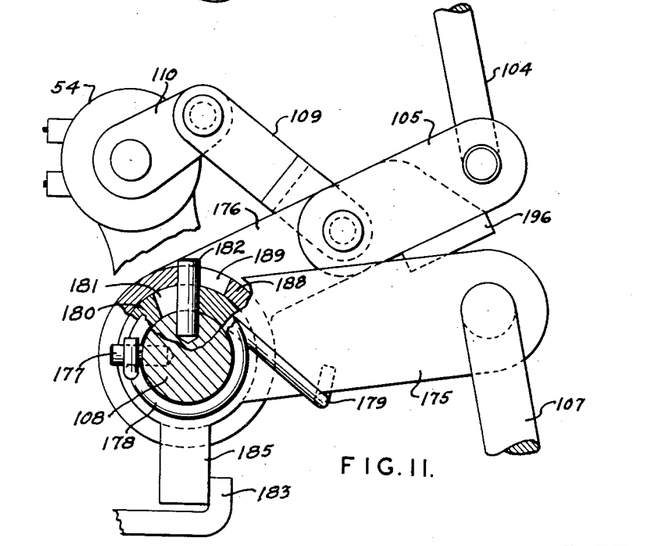
Fig. 11 is an end view of the mechanism of Fig. 10, partly in section.

In Figs. 9, 10 and 11 is shown a mechanism similar to that of Fig. 4 for operating the throttle to full open position by actuation of control selector lever 55. This requires a different mechanism to actuate the links 104, 107, and 109 from lever 55 through shaft 108. Otherwise the structure is the same as in Fig. 4, and the same reference characters have been used. Since the throttle linkage has been described, one description will suffice for an understanding of both modifications.

Shaft 108 has a radially extending fixed pin 177 which engages one of the hooked ends of a torsion spring 178. The other hooked end 179 engages beneath lever 175 as shown. The spring is tensioned to constantly urge the lever 175 in a counter-clockwise direction on shaft 108. In order to prevent the lever 175 from rotating on shaft 108 due to the spring pressure, the lever is shown in Fig. 11 constructed with a cylindrical sleeve bearing 180 provided with a radial slot 181 to receive a pin 182 fixed in the shaft and extending radially therefrom through slot 181. Spring pressure will maintain the end of slot 181 against the pin. Consequently, clockwise rotation of shaft 108 will be positively transmitted to lever 175 by the pin 182. In order to limit the rotation of lever 175 in a counter-clockwise direction, a stop 183 mounted on a fixed abutment 184 engages with a lug 185 projecting radially from sleeve 180 of lever 175.

The mechanism so far described provides for positive movement of lever 175 and link 107 for positions of transmission control selector lever 55 indicated as N–D–L and R. When the lever 55 is moved into the N position, lug 185 engages stop 183, and further movement of lever 55 to the positions C and H is permitted by slot 181 without moving lever 175, and merely tensions the spring 178, which, of course, produces a force tending to return the lever 55 to the N position when manual pressure is released.

In order to operate the throttle linkage 104, etc., from shaft 108, a lost motion connection is provided between shaft 108 and lever 176. This comprises a sleeve 188 on lever 176 rotatably mounted on sleeve 180 and provided with a radial slot 189 receiving pin 182. The left end of slot 189 is held in engagement with pin 182 by spring 98, and the slot provides for free rotation of lever 55 from positions N to R, but any rotation of lever 55 from N to C and H operates to engage pin 182 in slot 189 and rotate lever 176 with shaft 108, thereby actuating the throttle and closing switch 54 through link and lever connection 109 and 110.

The lost motion linkage 105 is, in turn, pivotally mounted on the pivot between the arm 176 and linkage 109. The lost motion connection comprises link 105, to which is pivotally connected link 104 of the throttle-operating mechanism. In order to prevent throttle actuation from operating arm 176, it is necessary that some such means as the lost motion link 105 be provided. In order to transmit counter-clockwise movement of the arm 176 to the arm 105, a lug 196 is arranged in abutting relation with the underside of link 105.

A mechanism has been provided which is selective in its operation, so that movement of the transmission control selector lever 55 in the range of positions from N to R positively actuates the transmission control link 107 but does not interfere with the throttle-actuating linkage, since opening and closing movement of the throttle linkage will rotate lever 105. On the other hand, movements of the transmission control selector lever 55 in the range of positions from N to H will provide positive throttle and starting switch operation without interference with the transmission control linkage, which will remain in a neutral selected position, held by the tension of spring 178 and fixed stop 183. The pin 182 in slot 181 will permit actuation of the throttle linkage while lever 175 remains stationary.

The circuits described are regarded as merely illustrative, and, as has been shown, the switches S—SS and PS are interchangeable in any of the circuits, since they appear to operate in the same manner for the same purpose, but any two may be used in any circuit, if desired, and connected in series for reasons of safety.

Although the preferred forms of my invention are illustrated and described above, the exclusive use of all modifications or embodiments as come within the scope of the appended claims is contemplated.

I claim:

1. In a motor vehicle, a transmission, an engine for operating said transmission, throttle means for regulating the admission of fuel to said engine including a manual operator, a starting motor having a control circuit including a switch, a control lever movable to indicated positions, a connection between said lever and said transmission to control transmission action, and means responsive to movement of said control lever to a predetermined position for engaging and partially opening said fuel regulating means and for operating said switch and energizing said starting motor circuit.

2. In a motor vehicle, a transmission, an engine for operating said transmission, throttle means for regulating the admission of fuel to said engine including a manual operator, a starting motor having a control circuit including a switch, a control lever movable to indicated positions, a connection between said lever and said transmission to control transmission action, means responsive to movement of said control lever to a predetermined position for engaging and partially opening said fuel regulating means and for operating said switch and energizing said starting motor circuit, and additional means responsive to a condition indicative of operation of said engine for opening said starting motor control circuit.

3. In a motor vehicle, a transmission, an engine for operating said transmission, throttle means for regulating the admission of fuel to said engine including a manual operator, a starting motor having a control circuit including a switch, a control lever movable to and from indicated driving and neutral positions, a connection between said lever and said transmission to control the transmission action, means responsive to movement of said control lever through a predetermined range of neutral positions for consecutively engaging said fuel regulating means and thereby opening said means a predetermined distance and then for closing said switch and energizing said starting motor control circuit, and additional means responsive to a condition indicative of operation of said engine for opening said starting motor control circuit.

4. In a motor vehicle, a transmission, an engine for operating said transmission, throttle means for regulating the admission of fuel to said engine including a manual operator, a control lever movable to indicated positions to control transmission action independently of said fuel regulating means and movable to other positions in a neutral range of transmission response, and additional means responsive to movement of said control lever to positions within said neutral range for opening said fuel regulating means to increase the engine speed.

5. In a motor vehicle, a transmission, an engine for said transmission, throttle means for regulating the admission of fuel to said engine including a manual operator, a control lever movable to indicated positions to control transmission action independently of said fuel regulating means and movable to other positions in a neutral range of transmission response, additional means responsive to movement of said control lever to some of said other positions within said neutral range for partially opening said fuel regulating means to increase the engine speed, and resilient means for returning said control lever from said last named positions.

6. In a motor vehicle, a transmission, an engine for said transmission, a control for said engine including a manual operator, a starting motor for said engine, a control circuit for said motor including a switch, a control lever for said transmission connected with said transmission, with a control for said engine and with said switch, and movable to positions to control transmission action and to other positions to energize said circuit by closing said switch, and means responsive to movements of said control lever to energize said circuit for actuating said control for said engine.

7. In a motor vehicle, a transmission, an engine for said transmission, a control for said engine including a manual operator, a starting motor for said engine, a control circuit for said motor including a switch, a control lever connected to said transmission and said engine and movable to positions to control transmission action and to other positions displaced from said first positions to actuate said control for said engine, and means including a connection between said lever and said switch responsive to movement of said control lever to one of said other positions for closing said switch for energizing said starting motor circuit.

8. In a motor vehicle, a transmission, an engine for said transmission, throttle means for regulating the admission of fuel to said engine including a manual operator, a starting motor having a control circuit, a switch in said control circuit, a control lever connected to said transmission and movable to positions for selecting transmission response during operation of said engine and to other positions within a neutral range displaced from said first positions, means responsive to movement of said control lever to one of said other positions for closing said switch and energizing said starting motor circuit when said engine is not in operation, an additional means operated in response to movement of said control lever for opening said fuel regulating means for said engine during energization of said starting motor circuit by said first means.

9. In a motor vehicle, a transmission, an engine for operating said transmission, throttle means for regulating the admission of fuel to said engine including a manual operator, a starting motor having a circuit including a switch, a control lever connected to said transmission and movable to positions for selecting transmission response and to other positions within a neutral range displaced from said first positions, means responsive to movement of said control lever to said other positions including a connection between said lever and said fuel regulating means for consecutively opening said fuel regulating means and for closing said switch to energize said starting motor circuit.

10. In a motor vehicle, an automatic transmission, an engine connected to the transmission, a fuel supply for said engine, throttle means including a manual operator for increasing said fuel supply for accelerating said engine, a startor motor having a circuit including a normally open control switch, a control lever having a connection with the transmission and movable to positions selecting transmission response and neutral conditions for said transmission, said lever having a range of movement available which does not affect the neutral condition of the transmission, said control switch and said throttle means being positioned for actuation by said control lever when the latter is operated within its available movement in said neutral range.

11. In a motor vehicle, a transmission, an engine for operating said transmission, throttle means for regulating the admission of fuel to said engine including a manual operator, a control lever movable to indicated positions to control transmission action independently of said fuel regulating means and movable to other positions in a neutral range of transmission response, and additional means including a lost motion connection with said manual operator responsive to movement of said control lever to positions within said neutral range for opening said fuel regulating means to increase the engine speed.

12. In a motor vehicle, a transmission, an engine driving said transmission, throttle means for regulating the admission of fuel to said engine including a manual operator, a generator driving by said engine, a starter motor having a control circuit including a switch, a control selector movable to indicated positions, a connection between said control selector and said transmission to control transmission action, means responsive to movement of said control selector to predetermined positions for opening said fuel regulating means and for operating said switch and energizing said starter motor control circuit, and additional means including a ground connection for said starting motor control circuit to the output side of said generator responsive to a condition indicative of operation of said engine for opening said starter motor control circuit.

13. In a motor vehicle, a transmission, an engine driving said transmission, a carburetor on said engine, carburetor throttle means for regulating the admission of fuel to said engine including a manual operator, an automatic mixture control for said carburetor including a connection with said throttle to override said automatic mixture control in the final range of open positions for said throttle, a transmission selector control movable to indicated positions to select transmission action independent of said carburetor throttle means and movable to other positions to select a neutral range of transmission response, and additional means responsive to movements of said selector control when in said neutral range for opening said throttle means varying degrees from closed to wide open and to override said automatic mixture control in the final range of open positions of said throttle.

14. In a motor vehicle, a transmission, an engine, a starter motor, and a plurality of controls for operating said engine and transmission, comprising a throttle control, including a manual operator, a starter motor control circuit including a switch, and a control lever for said transmission, and mechanism for selectively operating said controls by said control lever independently of said throttle control, including a first arm operated by said control lever and connected to said transmission, a second arm operated by said control lever and connected to said throttle control and said starter motor control switch, abutment means operated by said control lever for actuating said second arm on movement of said control lever in one direction, and resilient means for moving said control lever in the opposite direction.

15. In a motor vehicle, an engine, a transmission throttle means for regulating the fuel mixture to said engine including a manual operator, a transmission control selector movable to indicated positions to control transmission action independently of said fuel regulating means and movable to other positions in a neutral range of transmission response, control connections operated by said selector and extending to said mixture regulator and said transmission, and operating means for said control connections from said selector, including a one-way positive drive between said connections to said mixture regulator and said selector for selective operation of said mixture regulator by movement of said selector in one direction.

16. In a motor vehicle having an engine, a starter motor for said engine, and a transmission, a plurality of controls comprising a transmission control, an engine throttle control and an engine starter motor control, the combination of a control lever and mechanism for selectively operating each of said controls by said control lever, comprising a first arm operable by said lever connected to said transmission control, a second arm operable by said lever connected to said throttle control and said starter motor control, and abutment means operated by said control lever alternately engaging said arms on movement of said control lever in different directions.

17. In a motor vehicle, a transmission, an engine for operating said transmission, throttle means for regulating the fuel mixture to said engine including a manual operator, and a transmission control selector lever movable to indicated positions to control transmission action independently of said fuel regulating means and movable to other positions in a neutral range of transmission response, and separate control connections operated by said lever and extending to said mixture regulator and said transmission, and operating means for said control connections from said lever, comprising oppositely acting, one-way, positive drives between said separate connections and said lever for selectively operating said connections by opposite movements of said lever.

18. In a motor vehicle, an engine, a transmission, a starter motor, and a plurality of controls, comprising a transmission control, an engine throttle control having a manual actuator, a starter motor control circuit including a switch, a manual selector movable to indicated positions to control transmission action independently of said engine throttle control, a dial having a plurality of indicia for indicating selected positions of said manual selector for predetermined transmission action and for predetermined throttle control, and mechanism for selectively operating said controls by said manual selector, including a first connection to said transmission control and a second connection to said throttle control and said switch, and means selectively operating said connections from said manual selector by movement of said selector according to indicated positions on said dial, including additional means responsive to movement of said selector within a neutral range of transmission response for operating said second connection for opening said engine throttle control.

References Cited in the file of this patent

UNITED STATES PATENTS

| Number | Name | Date |
|---|---|---|
| 2,374,303 | Osborne | Apr. 24, 1945 |
| 2,609,514 | Schneider | Sept. 2, 1932 |